(12) United States Patent
Ouchiyama et al.

(10) Patent No.: US 11,692,306 B2
(45) Date of Patent: Jul. 4, 2023

(54) MULTIAXIAL TEXTILE RESIN BASE MATERIAL AND METHOD OF PRODUCTION THEREOF

(71) Applicant: Toray Industries, Inc., Tokyo (JP)

(72) Inventors: Naoya Ouchiyama, Nagoya-she (JP); Hiroyuki Ome, Nagoya (JP); Akihiko Shirahase, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 268 days.

(21) Appl. No.: 17/265,571

(22) PCT Filed: Aug. 1, 2019

(86) PCT No.: PCT/JP2019/030184
§ 371 (c)(1),
(2) Date: Feb. 3, 2021

(87) PCT Pub. No.: WO2020/031834
PCT Pub. Date: Feb. 13, 2020

(65) Prior Publication Data
US 2021/0301462 A1    Sep. 30, 2021

(30) Foreign Application Priority Data

Aug. 7, 2018  (JP) .................................. 2018-148316
Aug. 7, 2018  (JP) .................................. 2018-148317

(51) Int. Cl.
*B32B 5/00*     (2006.01)
*D06M 17/00*  (2006.01)
(Continued)

(52) U.S. Cl.
CPC ............. *D06M 17/00* (2013.01); *C08L 63/04* (2013.01); *C08L 67/02* (2013.01); *B32B 5/073* (2021.05);
(Continued)

(58) Field of Classification Search
None
See application file for complete search history.

(56) References Cited

U.S. PATENT DOCUMENTS

2010/0086727 A1* 4/2010 Katayama ................ D04H 3/10
                                                              428/102
2015/0258712 A1* 9/2015 Moser ...................... D04H 1/74
                                                              428/113
(Continued)

FOREIGN PATENT DOCUMENTS

JP    2002-227066 A    8/2002
JP    2002-227068 A    8/2002
(Continued)

*Primary Examiner* — Alexander S Thomas
(74) *Attorney, Agent, or Firm* — DLA Piper LLP (US)

(57) ABSTRACT

A multiaxial fabric resin base material includes a multiaxial fabric base material laminate impregnated with a thermosetting resin (B), the multiaxial fabric base material laminate including fiber bundle sheets layered at different angles, the fiber bundle sheets including unidirectionally aligned fiber bundles stitched with stitching yarns composed of a thermoplastic resin (A), the multiaxial fabric base material laminate being penetrated in the thickness direction by other bodies of the stitching yarns, and being stitched with the other bodies of the stitching yarns such that the yarns reciprocate at predetermined intervals along the longitudinal direction, the thermoplastic resin (A) constituting the stitching yarns having a softening point, the softening point being higher than the resin impregnation temperature of the thermosetting resin (B).

10 Claims, 2 Drawing Sheets

(51) Int. Cl.
  *C08L 63/04* (2006.01)
  *C08L 67/02* (2006.01)
  *B32B 5/06* (2006.01)

(52) U.S. Cl.
  CPC ...... *D10B 2101/06* (2013.01); *D10B 2101/12* (2013.01); *D10B 2331/06* (2013.01)

(56) References Cited

U.S. PATENT DOCUMENTS

| | | |
|---|---|---|
| 2015/0266268 A1 | 9/2015 | Coxon |
| 2018/0281343 A1 | 10/2018 | Harada et al. |
| 2019/0055398 A1 | 2/2019 | Tojo et al. |

FOREIGN PATENT DOCUMENTS

| | | |
|---|---|---|
| JP | 2003-019763 A | 1/2003 |
| JP | 2006-150904 A | 6/2006 |
| JP | 2006-291369 A | 10/2006 |
| JP | 2015-183186 A | 10/2015 |
| JP | 2018-039970 A | 3/2018 |
| WO | 2017/104481 A1 | 6/2017 |

\* cited by examiner

MULTIAXIAL TEXTILE RESIN BASE MATERIAL AND METHOD OF PRODUCTION THEREOF

TECHNICAL FIELD

This disclosure relates to a multiaxial fabric resin base material and a method of producing it.

BACKGROUND

Advanced composite materials using carbon fibers or aramid fibers as a reinforcing material are increasingly applied mainly to the field of aerospace. Among such materials, three-dimensional fabric-reinforced composites have a relatively long history of technology development, and have been partially practically used. In particular, in recent years, they are drawing attention from the viewpoint of cost reduction, and research and technology development therefor have proceeded. Multilayered fiber structures obtained by textile technology include interlock fabrics obtained by improvement of the shedding method for looms for flat fabrics, and multiaxial fabrics, which have out-of-plane yarns. In particular, the multiaxial-fabric technique is known to be a hopeful technique of providing composite preforms since multiaxial fabrics can have good in-plane shear properties by alignment of bias direction yarns.

For the multiaxial-fabric technique, the stitch technique is indispensable. A laminate structure can be obtained by allowing stitching yarns to penetrate in the thickness direction, and performing stitching by reciprocating the stitching yarns along the surface direction between the front surface and the back surface of the laminated body. Since the laminate structure has only a small number of crimp portions, and excellent surface smoothness, it can be advantageously subjected to resin impregnation. On the other hand, mainly in the fields of aircraft and automobiles, the most recent technology development has been strongly demanded to provide technology development for highly functional multiaxial fabrics using a stitching yarn technique that gives stitching yarns not only the function as fixing yarns for multiaxial fabrics, but also added values such as impact resistance, and/or using a stitching yarn technique that gives stitching yarns high durability (hydrolysis resistance and heat deterioration resistance).

Examples of multiaxial fabrics using a thermoplastic polyester resin composition as stitching yarns include those in JP 2006-291369 A and JP 2006-150904 A.

JP '369 discloses a multiaxial fabric comprising a multiaxial fabric base material and a thermoplastic resin film integrated together by stitching with stitching yarns.

JP '904 discloses a composite sheet comprising: a multiaxial fabric base material; and a unidirectionally oriented fiber reinforcing sheet temporarily adhering and bound thereto via a resin layered on at least one side of the base material; the base material and the sheet being integrated together by stitching with stitching yarns oriented in the reinforcing-fiber-sheet direction.

However, in the technique described in JP '369, while a multiaxial fabric having excellent moldability and resin impregnation properties can be obtained, its stitching yarns are not improved in terms of hydrolysis resistance and heat deterioration resistance. Moreover, impact resistance and compressive strength (CAI) are not improved. Thus, the multiaxial fabric is practically unsatisfactory.

In the technique described in JP '904, while the surface smoothness and the resin impregnation properties are improved by bonding a thermoplastic resin sheet by thermal fusion onto the surface of a multiaxial fabric base material, durability and impact resistance of the linking stitching yarns are not improved. Thus, there remain practical problems.

In view of this, it could be helpful to provide a multiaxial fabric resin base material having excellent resin impregnation properties, composite-material dynamic properties (mechanical properties, CAI), hydrolysis resistance, and heat deterioration resistance.

SUMMARY

We thus provide:

A fiber-reinforced resin base material having at least one of the following configurations:

a multiaxial fabric resin base material comprising a multiaxial fabric base material laminate impregnated with a thermosetting resin (B), the multiaxial fabric base material laminate comprising fiber bundle sheets layered at different angles, the fiber bundle sheets comprising unidirectionally aligned fiber bundles stitched with stitching yarns composed of a thermoplastic resin (A), the multiaxial fabric base material laminate being penetrated in the thickness direction by other bodies of the stitching yarns, and stitched with the other bodies of the stitching yarns such that the yarns reciprocate at predetermined intervals along the longitudinal direction, the thermoplastic resin (A) having a softening point, the softening point being higher than the resin impregnation temperature of the thermosetting resin (B);

or a multiaxial fabric resin base material comprising a multiaxial fabric impregnated with a thermosetting resin (B), the multiaxial fabric comprising a laminated body comprising a multiaxial fabric base material comprising fiber bundle sheets layered at different angles, the fiber bundle sheets comprising unidirectionally aligned fiber bundles stitched with stitching yarns composed of a thermoplastic resin (A), the multiaxial fabric base material being penetrated in the thickness direction by other bodies of the stitching yarns, the laminated body being stitched with the other bodies of the stitching yarns such that the yarns reciprocate at predetermined intervals along the surface direction between the front surface and the back surface of the laminated body, the thermoplastic resin (A) having a softening point, the softening point being higher than the resin impregnation temperature of the thermosetting resin (B).

The method of producing the fiber-reinforced composite has the following configuration:

a method of producing a multiaxial fabric composite, the method comprising the steps of:

impregnating, with a thermosetting resin (B), a multiaxial fabric base material laminate comprising fiber bundle sheets layered at different angles, the fiber bundle sheets comprising unidirectionally aligned fiber bundles stitched with stitching yarns composed of a thermoplastic resin (A), the multiaxial fabric base material laminate being penetrated in the thickness direction by other bodies of the stitching yarns, and being stitched with the other bodies of the stitching yarns such that the yarns reciprocate at predetermined intervals along the longitudinal direction; and curing the thermosetting resin (B);

wherein the thermoplastic resin (A) has a softening point, the softening point being higher than the resin impregnation temperature of the thermosetting resin (B); and in an early spinodal decomposition process due to the curing of the thermosetting resin (B), a process of forming a both-phase continuous structure having an (A)-component or (B)-component structural period of 0.001 to 0.1 μm is followed by a process of forming a both-phase continuous structure having a structural period of 0.01 to 1 μm or forming a dispersion structure having an interparticle distance of 0.01 to 1 μm.

In the fiber-reinforced resin base material, the thermoplastic resin (A) is preferably composed of a thermoplastic polyester resin composition (C) having a carboxyl group concentration of 0 to 20 eq/t.

The thermoplastic polyester resin composition (C) is preferably a resin composition comprising: (a) 0.05 to 5 parts by weight of a novolac epoxy resin represented by General Formula (1); and (b) 0.01 to 1 part by weight of a reducing phosphorus compound represented by General Formula (4); with respect to 100 parts by weight of thermoplastic polyester resin.

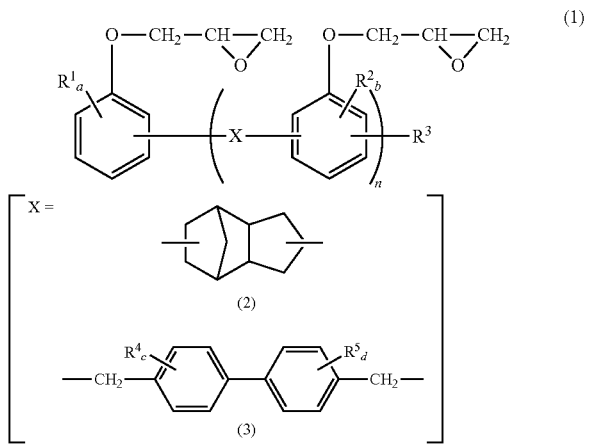

wherein in General Formula (1), X represents a divalent group represented by General Formula (2) or (3);

in General Formulae (1) and (3), $R^2$, $R^4$, and $R^5$, which may be the same or different, each independently represent $C_1$-$C_8$ alkyl or $C_6$-$C_{10}$ aryl; and $R^3$ represents a hydrogen atom, $C_1$-$C_8$ alkyl, or $C_6$-$C_{10}$ aryl;

in General Formula (1), n represents a value which is higher than 0 and not higher than 10; and in General Formulae (1) and (3), a, c, and d each independently represent an integer of 0 to 4, and b represents an integer of 0 to 3.

wherein in General Formula (4), $R^6$ and $R^7$ are each independently selected from the group consisting of hydrogen (with the proviso that $R^6$ and $R^7$ are not simultaneously hydrogen), OM (wherein 0 is a negatively charged oxygen atom, and M is a positively charged counter ion), $C_1$-$C_{20}$ alkyl, $C_2$-$C_{20}$ alkylene, $C_6$-$C_{20}$) aryl, $C_1$-$C_{20}$ alkyloxy, polyoxyalkylene composed of $C_2$-$C_4$ alkylene, and $C_6$-$C_{20}$ aryloxy;

the alkyl, alkylene, aryl, alkyloxy, polyoxyalkylene, and/or aryloxy is/are optionally arbitrarily selectively substituted, and the substituent(s) for the arbitrary selective substitution is/are independently selected from the group consisting of an OH group, a halogen, a COOH group, a $COOR^8$ group (wherein $R^8$ is $C_1$-$C_4$ alkyl), and an $NH_2$ group;

the number of substitutions, when the alkyl, alkylene, aryl, alkyloxy, polyoxyalkylene, and/or aryloxy is/are arbitrarily selectively substituted, is 1 or 2; and $R^6$ and $R^7$ are optionally linked together by cross-linking.

The thermoplastic polyester resin composition (C) is preferably a polyethylene terephthalate resin composition.

The multiaxial fabric base material preferably has an areal weight of 10 to 2000 $g/m^2$.

The multiaxial fabric base material is preferably integrated with a porous thermoplastic resin layer(s) by stitching with the other bodies of the stitching yarns.

The porous thermoplastic resin layer(s) preferably has/have an areal weight of 5 to 50 $g/m^2$.

The porous thermoplastic resin layer(s) is/are preferably a non-woven fabric(s) of thermoplastic resin fibers.

The fiber bundles are preferably composed of carbon fibers or glass fibers.

A multiaxial fabric resin base material having high durability, high impact resistance, and high impregnation properties can be obtained by using, as a stitching yarn, a thermoplastic polyester resin composition having excellent hydrolysis resistance, heat deterioration resistance, and compressive strength after impact.

DETAILED DESCRIPTION

Figure 1:
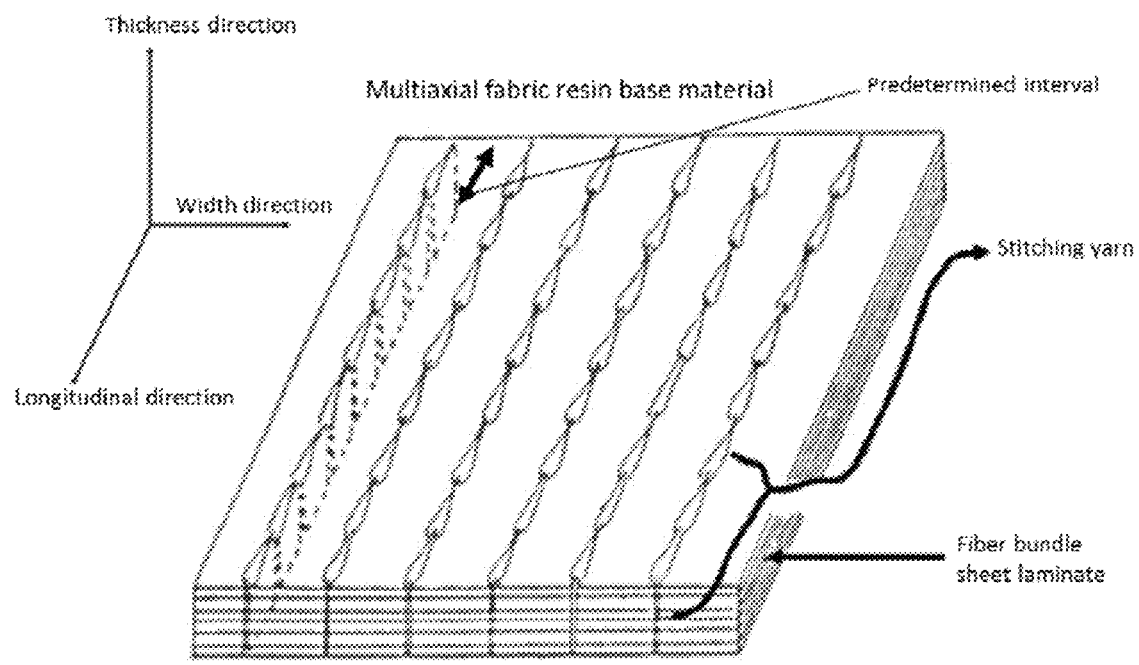
FIG. 1 is a perspective view illustrating one example of the fiber-reinforced resin base material.
Figure 2:
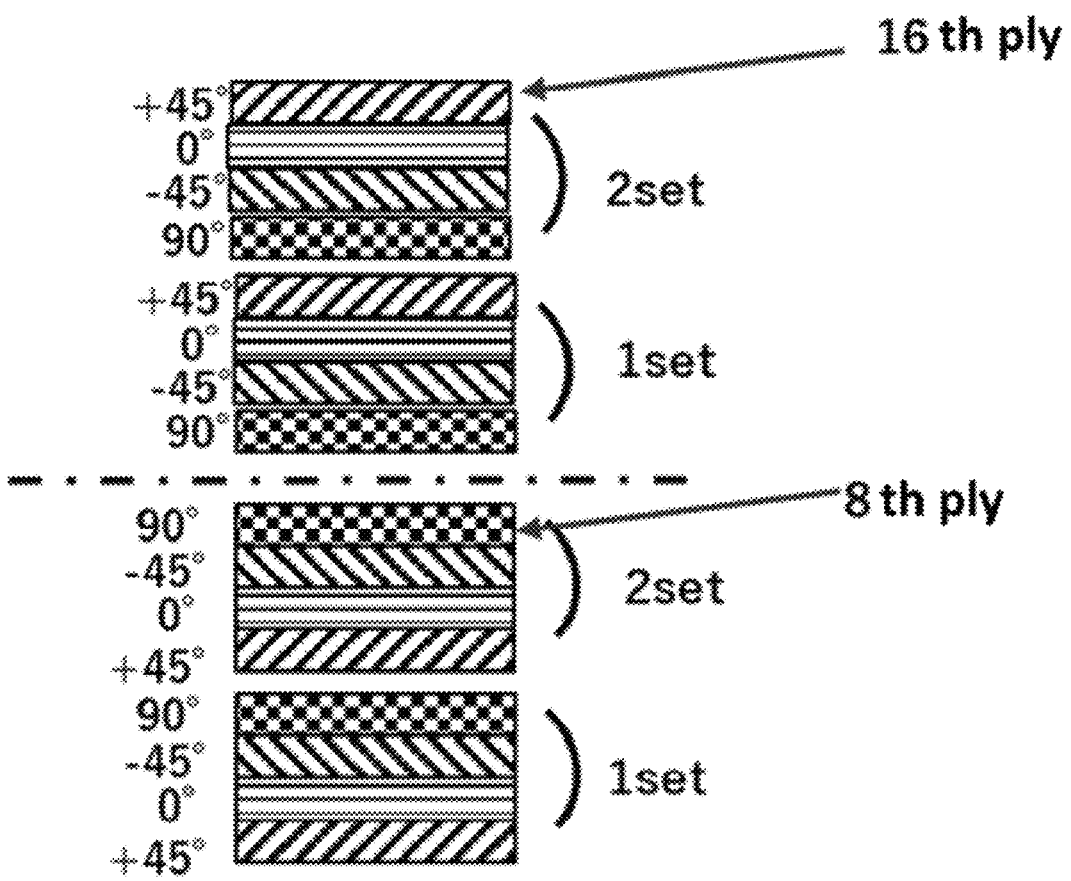
FIG. 2 is a cross-sectional view in the thickness direction, illustrating one example of the layer configuration of the fiber-reinforced resin base material, wherein a multiaxial fabric base material is formed by lamination of 16 layers (16 ply) at arbitrary angles to a lamination thickness of 1 mm ([+45°/0°/−45°/90°]$_{2s}$).

Examples are described below in detail.
Thermoplastic Resin (A)

The thermoplastic resin (A) used for the stitching yarns may be either a crystalline resin or an amorphous resin. The component (A) has a softening point higher than the resin impregnation temperature of the thermosetting resin (B), with which the multiaxial fabric base material is impregnated. The "softening point" means the temperature at which the stitching yarns are softened/melted when the temperature of the stitching yarns increased. More specifically, the "softening point" means the melting point when the stitching yarns are composed of a crystalline resin, or means the glass transition temperature when the stitching yarns are composed of an amorphous resin. When the stitching yarns are composed of a crystalline resin, the softening point (that is, the melting point) is preferably not less than 140° C., more preferably not less than 180° C. When the stitching yarns are composed of an amorphous resin, the softening point (that is, the glass transition temperature) is preferably not less than 130° C., more preferably not less than 160° C. When the softening point of the stitching yarns composed of the thermoplastic resin (A) is lower than the resin impregnation temperature of the thermosetting resin (B), the thermosetting resin tends to be compatibilized with the component (A) upon the resin impregnation, leading to an increased viscosity, which results in poor impregnation properties.

Thermosetting Resin (B)

The "resin impregnation temperature" means the temperature at which the multiaxial fabric laminate base material is impregnated with the thermosetting resin (B), which temperature corresponds to a temperature condition at a level at which the thermosetting resin (B) has fluidity. When the temperature is excessively increased to a temperature of not less than the resin impregnation temperature, the temperature reaches the curing temperature, causing a sharp increase in the viscosity, which results in poor impregnation.

The thermosetting epoxy resin (B) is preferably an epoxy resin whose precursor is a compound such as a phenol, an amine, a carboxylic acid, or an intramolecular unsaturated carbon.

Examples of glycidyl ether-type epoxy resins whose precursor is a phenol include bisphenol A-type epoxy resins, bisphenol F-type epoxy resins, bisphenol S-type epoxy resins, epoxy resins having a biphenyl backbone, phenol novolac-type epoxy resins, cresol novolac-type epoxy resins, resorcinol-type epoxy resins, epoxy resins having a naphthalene backbone, trisphenylmethane-type epoxy resins, phenol aralkyl-type epoxy resins, dicyclopentadienetype epoxy resins, and diphenylfluorene-type epoxy resins; isomers thereof; and alkyl- or halogen-substituted products thereof. Examples of this type of epoxy resins also include compounds produced by modifying a phenolic epoxy resin with urethane or isocyanate.

Examples of glycidyl amine-type epoxy resins whose precursor is an amine include tetraglycidyl diaminodiphenyl methane, glycidyl compounds of xylenediamine, triglycidyl aminophenol, and glycidylaniline; regioisomers thereof; and substituted products thereof with alkyl or halogen.

Examples of epoxy resins whose precursor is a carboxylic acid include glycidyl compounds of phthalic acid, and isomers of glycidyl compounds of hexahydrophthalic acid and dimer acid.

Examples of epoxy resins whose precursor is an intramolecular unsaturated carbon include alicyclic epoxy resins.

The epoxy equivalent of the epoxy resin is preferably 90 to 3000. When the epoxy equivalent is higher than 3000, the resin may have high viscosity so that a prepreg prepared from the resin composition may have low tackiness and low drape properties. When the epoxy equivalent is lower than 90, the resin may have high cross-linking density so that the cured product may be fragile.

The curing agent for the epoxy resin is not limited as long as the epoxy resin can be cured therewith. The curing agent may be a curing agent that causes addition reaction of an amine, acid anhydride, or the like, or may be a curing catalyst that causes addition polymerization such as cationic polymerization or anionic polymerization. Two or more kinds of curing agents may be used in combination. The curing agent is preferably a compound containing an amino group, acid anhydride group, or azide group. Examples of the curing agent include dicyandiamide, alicyclic amine, aliphatic amine, aromatic amine, aminobenzoic acid esters, acid anhydrides, phenol novolac resins, cresol novolac resins, imidazole derivatives, and phenolic compounds such as t-butylcatechol; and Lewis acid complexes such as boron trifluoride complex and boron trichloride complex. The amount of the curing agent added for the addition reaction is preferably 0.5 to 1.5 equivalents with respect to 1 equivalent of epoxy groups. When the amount is less than 0.5 equivalent, the resin is not completely cured so that good mechanical properties cannot be obtained. When the amount is larger than 1.5 equivalents, a large amount of unreacted curing agent remains so that good mechanical properties cannot be obtained. The amount of the curing catalyst added is not limited, and is preferably 0.1 to 5 parts by weight with respect to 100 parts by weight of the epoxy resin.

Thermoplastic Polyester Resin Composition (C)

As the thermoplastic resin (A) constituting the stitching yarns, a thermoplastic polyester resin composition (C) is especially preferably used. By this, the composite can have improved water resistance compared to instances where a resin having high water absorbability such as a polyamide is used. As a result, the multiaxial fabric composite can be preferably used for a molded article such as a primary structural member for aircraft.

The thermoplastic polyester resin composition (C) preferably contains: (a) 0.05 to 5 parts by weight of a novolac epoxy resin represented by General Formula (1); and (b) 0.01 to 1 part by weight of a reducing phosphorus compound represented by General Formula (4); with respect to 100 parts by weight of thermoplastic polyester resin. Although a thermoplastic polyester resin has excellent injection moldability and mechanical properties, the resin easily undergoes degradation of ester bonds due to hydrolysis, resulting in an increase in the carboxyl group concentration. As the carboxyl group concentration increases, lowering of the molecular weight of the thermoplastic polyester resin is promoted, leading to deterioration of the mechanical properties. Inclusion of the (a) novolac epoxy resin represented by General Formula (1) together with the thermoplastic polyester resin causes reaction between carboxyl groups of the thermoplastic polyester resin produced by the hydrolysis and epoxy groups of the (a) novolac epoxy resin represented by General Formula (1), to enable suppression of the increase in the carboxyl group concentration. Thus, the original high mechanical properties of the thermoplastic polyester resin can be maintained.

When ester groups of a thermoplastic polyester resin are degraded by oxidative deterioration under a high temperature environment, the carboxyl group concentration increases, leading to deterioration of hydrolysis resistance and strength. Thus, when the resin is exposed to a high temperature environment for a long time, or in melt retention at high temperature, the hydrolysis resistance may be insufficient even when the (a) novolac epoxy resin represented by General Formula (1) is included. However, by further inclusion of the (b) reducing phosphorus compound, organic peroxides produced by the oxidative deterioration can be reduced by the (b) reducing phosphorus compound, to enable suppression of the increase in the carboxyl groups produced as a degradation product.

Thermoplastic Polyester Resin

The thermoplastic polyester resin used for the thermoplastic polyester resin composition (C) is a polymer or copolymer containing, as a major structural unit(s), at least one residue selected from the group consisting of: (1) a dicarboxylic acid or an ester-forming derivative thereof, and a diol or an ester-forming derivative thereof; (2) hydroxycarboxylic acid or an ester-forming derivative thereof; and (3) lactone. The term "containing, as a major structural unit(s)" means that at least one residue selected from the group consisting of (1) to (3) described above is contained at not less than 50 mol %. Preferably, the at least one residue is contained at not less than 80 mol %. In particular, a polymer or copolymer containing, as major structural units, residues of (1) a dicarboxylic acid or an ester-forming derivative thereof, and a diol or an ester-forming derivative thereof, is preferred since it has excellent mechanical properties and heat resistance.

Examples of the dicarboxylic acid or ester-forming derivative thereof include: aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl)methane, anthracene dicarboxylic acid, 4,4'-diphenyl ether dicarboxylic acid, 5-tetrabutyl phosphonium isophthalic acid, and 5-sodium sulfoisophthalic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid and 1,4-cyclohexanedicarboxylic acid; and ester-forming derivatives thereof. Two or more of these may be used.

Examples of the diol or ester-forming derivative thereof include: $C_2$-$C_{20}$ aliphatic or alicyclic glycols such as ethylene glycol, propylene glycol, 1,4-butanediol, neopentyl glycol, 1,5-pentanediol, 1,6-hexanediol, decamethylene glycol, cyclohexanedimethanol, cyclohexanediol, and dimer diols; long chain glycols having a molecular weight of 200 to 100,000 such as polyethylene glycol, poly-1,3-propylene glycol, and polytetramethylene glycol; aromatic dioxy compounds such as 4,4'-dihydroxybiphenyl, hydroquinone, t-butyl hydroquinone, bisphenol A, bisphenol S, and bisphenol F; and ester-forming derivatives thereof. Two or more of these may be used.

Examples of the polymer or copolymer containing, as structural units, a dicarboxylic acid or an ester-forming derivative thereof, and a diol or an ester-forming derivative thereof, include aromatic polyester resins such as polyethylene terephthalate, polypropylene terephthalate, polybutylene terephthalate, polypropylene isophthalate, polybutylene isophthalate, polybutylene naphthalate, polypropylene isophthalate/terephthalate, polybutylene isophthalate/terephthalate, polypropylene terephthalate/naphthalate, polybutylene terephthalate/naphthalate, polybutylene terephthalate/decane dicarboxylate, polypropylene terephthalate/5-sodium sulfoisophthalate, polybutylene terephthalate/5-sodium sulfoisophthalate, polypropylene terephthalate/polyethylene glycol, polybutylene terephthalate/polyethylene glycol, polypropylene terephthalate/polytetramethylene glycol, polybutylene terephthalate/polytetramethylene glycol, polypropylene terephthalate/isophthalate/polytetramethylene glycol, polybutylene terephthalate/isophthalate/polytetramethylene glycol, polybutylene terephthalate/succinate, polypropylene terephthalate/adipate, polybutylene terephthalate/adipate, polypropylene terephthalate/sebacate, polybutylene terephthalate/sebacate, polypropylene terephthalate/isophthalate/adipate, polybutylene terephthalate/isophthalate/succinate, polybutylene terephthalate/isophthalate/adipate, and polybutylene terephthalate/isophthalate/sebacate. The symbol "/" represents a copolymer.

Among these, from the viewpoint of further improving the mechanical properties and heat resistance, the polymer or copolymer is more preferably a polymer or copolymer containing, as major structural units, a residue of an aromatic dicarboxylic acid or an ester-forming derivative thereof, and a residue of an aliphatic diol or an ester-forming derivative thereof. The polymer or copolymer is still more preferably a polymer or copolymer containing, as major structural units, a residue of terephthalic acid, naphthalene dicarboxylic acid, or an ester-forming derivative thereof, and a residue of an aliphatic diol selected from the group consisting of propylene glycol and butanediol, or an ester-forming derivative thereof.

Among these, aromatic polyester resins such as polyethylene terephthalate, polypropylene terephthalate, polybutylene terephthalate, polypropylene naphthalate, polybutylene naphthalate, polypropylene isophthalate/terephthalate, polybutylene isophthalate/terephthalate, polypropylene terephthalate/naphthalate, and polybutylene terephthalate/naphthalate are especially preferred. Polyethylene terephthalate is still more preferred from the viewpoint of its excellent moldability and heat resistance. Two or more of these may be used at arbitrary contents.

The ratio of terephthalic acid or its ester-forming derivative with respect to the total dicarboxylic acid constituting the polymer or copolymer containing, as major structural units, a residue of a dicarboxylic acid or an ester-forming derivative thereof, and a residue of a diol or an ester-forming derivative thereof, is preferably not less than 30 mol %, more preferably not less than 40 mol %.

A liquid crystalline polyester resin capable of developing anisotropy upon melting may be used as the thermoplastic polyester resin. Examples of structural units of the liquid crystalline polyester resin include aromatic oxycarbonyl units, aromatic dioxy units, aromatic and/or aliphatic dicarbonyl units, alkylene dioxy units, and aromatic imino-oxy units.

The amount of carboxyl terminal groups in the thermoplastic polyester resin is preferably not more than 20 eq/t, more preferably not more than 15 eq/t, from the viewpoint of fluidity, hydrolysis resistance, and heat resistance. The lower limit of the amount of carboxyl terminal groups is 0 eq/t. The value of the amount of carboxyl terminal groups in the thermoplastic polyester resin herein is a value measured by dissolving the thermoplastic polyester resin in an o-cresol/chloroform solvent, and then performing titration with ethanolic potassium hydroxide.

The weight average molecular weight (Mw) of thermoplastic polyester resin is preferably higher than 8000 and not higher than 500,000, more preferably higher than 8,000 and not higher than 300,000, still more preferably higher than 8,000 and not higher than 250,000, from the viewpoint of further improving the mechanical properties. The value of the Mw of the thermoplastic polyester resin is a value in terms of polymethyl methacrylate (PMMA) measured by gel permeation chromatography (GPC) using hexafluoroisopropanol as a solvent.

The thermoplastic polyester resin may be produced by a known polycondensation method, ring-opening polymerization method, or the like. The production method may be either batch polymerization or continuous polymerization, and the reaction applied may be either transesterification or direct polymerization. From the viewpoint of productivity, continuous polymerization is preferred. Direct polymerization is more preferably employed.

When the thermoplastic polyester resin is a polymer or copolymer obtained by condensation reaction using as major components a dicarboxylic acid or an ester-forming derivative thereof, and a diol or an ester-forming derivative thereof, the resin may be produced by subjecting the dicarboxylic acid or ester-forming derivative thereof, and the diol or ester-forming derivative thereof, to esterification reaction or transesterification reaction, and then performing polycondensation reaction.

To effectively promote the esterification reaction or transesterification reaction, and the polycondensation reaction, a polymerization reaction catalyst(s) is/are preferably added for these reactions. Specific examples of the polymerization reaction catalyst(s) include organic titanium compounds such as methyl ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of titanic acid, and mixed esters thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, and butylhydroxytin oxide, as well as alkyl stannonic acids including methyl stannonic acid, ethyl stannonic acid, and butyl stannonic acid; zirconia compounds such as zirconium tetra-n-butoxide; and antimony compounds such as antimony trioxide and antimony acetate. Two or more of these may be used.

Among these polymerization reaction catalysts, organic titanium compounds and tin compounds are preferred. Tetra-n-butyl ester of titanic acid is more preferably used. The amount of the polymerization reaction catalyst added is preferably 0.01 to 0.2 parts by weight with respect to 100 parts by weight of the thermoplastic polyester resin.

(a) Novolac Epoxy Resin

The thermoplastic polyester resin composition (C) is preferably a composition containing a (a) novolac epoxy resin represented by General Formula (1) in the thermoplastic polyester resin. As described above, thermoplastic polyester resins tend to be easily deteriorated due to hydrolysis. However, by inclusion of the (a) novolac epoxy resin represented by General Formula (1), improved hydrolysis resistance can be achieved. Further, by selecting a (a) novolac epoxy resin having the specific structure, bleed out of the (b) reducing phosphorus compound under a moist heat environment can be suppressed. Two or more of these may be included.

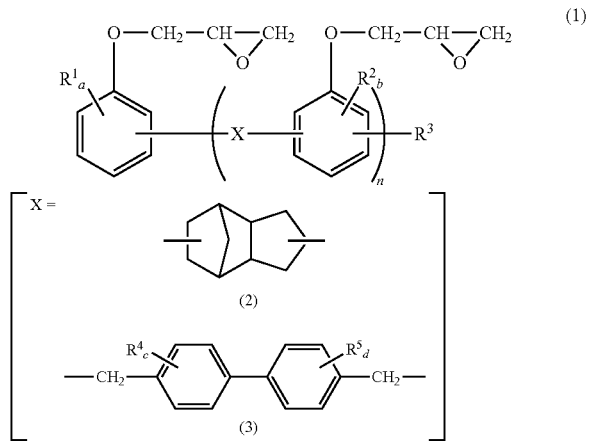

In General Formula (1), X represents a divalent group represented by General Formula (2) or (3). In General Formulae (1) and (3), $R^1$, $R^2$, $R^4$, and $R^5$, which may be the same or different, each independently represent $C_1$-$C_8$ alkyl or $C_6$-$C_{10}$ aryl. $R^3$ represents a hydrogen atom, $C_1$-$C_8$ alkyl, or $C_6$-$C_{10}$ aryl. In General Formula (1), n represents a value which is higher than 0 and not higher than 10. In General Formulae (1) and (3), a, c, and d each independently represent an integer of 0 to 4, and b represents an integer of 0 to 3.

From the viewpoint of further improving long-term hydrolysis resistance, X in General Formula (1) is preferably a divalent group represented by General Formula (2).

Examples of the $C_1$-$C_8$ alkyl include methyl, ethyl, n-propyl, isopropyl, n-butyl, sec-butyl, and tert-butyl. Among these, methyl is preferred from the viewpoint of reactivity. Examples of the $C_6$-$C_{10}$ aryl include phenyl, methylphenyl, dimethylphenyl, and naphthyl. Among these, phenyl is preferred from the viewpoint of reactivity. a, b, c, and d are preferably 0 or 1 from the viewpoint of reactivity.

The amount of the (a) novolac epoxy resin represented by General Formula (1) included is preferably 0.05 to 5 parts by weight with respect to 100 parts by weight of the thermoplastic polyester resin. When the amount of the (a) component is within the preferred range described above, excellent long-term hydrolysis resistance can be achieved; the heat resistance is unlikely to be deteriorated; and excellent residence stability can be achieved.

A preferred range of the amount of the (a) novolac epoxy resin represented by General Formula (1) may be set depending on the epoxy equivalent of the (a) novolac epoxy resin represented by General Formula (1). For example, the ratio of the amount of epoxy groups derived from the (a) novolac epoxy resin represented by General Formula (1) included in the thermoplastic polyester resin composition to the amount of carboxyl terminal groups derived from the thermoplastic polyester resin included in the thermoplastic polyester resin composition (the amount of epoxy groups included (eq/g)/the amount of carboxyl groups included (eq/g)) is preferably 1 to 7. When the amount of epoxy groups included (eq/g)/the amount of carboxyl groups included (eq/g) is not less than 1, improved long-term hydrolysis resistance can be achieved. The ratio is preferably not less than 2. When the amount of epoxy groups included (eq/g)/the amount of carboxyl groups included (eq/g) is not more than 7, higher levels of residence stability, heat resistance, and mechanical properties can be achieved at the same time. The ratio is preferably not more than 6, more preferably not more than 5.

The amount of carboxyl terminal groups derived from the thermoplastic polyester resin included in the thermoplastic polyester resin composition (C) can be calculated based on the carboxyl terminal group concentration in the thermoplastic polyester component and the ratio of the thermoplastic polyester component included in the entire (C) thermoplastic polyester resin composition. The carboxyl terminal group concentration in the thermoplastic polyester resin can be calculated by dissolving the thermoplastic polyester resin in an o-cresol/chloroform (2/1, vol/vol) mixed solution, and then performing titration with 0.05 mol/L ethanolic potassium hydroxide using 1% bromophenol blue as an indicator.

(b) Reducing Phosphorus Compound

The thermoplastic polyester resin composition (C) is preferably a composition further containing a (b) reducing phosphorus compound represented by General Formula (4) in the thermoplastic polyester resin. As described above, in a polyester composition containing a (a) novolac epoxy resin represented by General Formula (1), oxidative deterioration may occur under a high temperature environment to cause an increase in carboxyl groups, leading to deterioration of hydrolysis resistance. However, by further including the (b)

reducing phosphorus compound represented by General Formula (4), the increase in carboxyl groups due to the oxidative deterioration under a high temperature environment can be suppressed, to allow maintenance of excellent hydrolysis resistance.

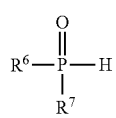

(4)

wherein in General Formula (4), $R^6$ and $R^7$ are each independently selected from the group consisting of hydrogen (with the proviso that $R^6$ and $R^7$ are not simultaneously hydrogen), OM (wherein 0 is a negatively charged oxygen atom, and M is a positively charged counter ion), $C_1$-$C_{20}$ alkyl, $C_2$-$C_{20}$ alkylene, $C_6$-$C_{20}$ aryl, $C_1$-$C_{20}$ alkyloxy, polyoxyalkylene composed of $C_2$-$C_4$ alkylene, and $C_6$-$C_{20}$ aryloxy;

the alkyl, alkylene, aryl, alkyloxy, polyoxyalkylene, and/or aryloxy is/are optionally arbitrarily selectively substituted, and the substituent(s) for the arbitrary selective substitution is/are independently selected from the group consisting of an OH group, a halogen, a COOH group, a $COOR^8$ group (wherein $R^8$ is $C_1$-$C_4$ alkyl), and an $NH_2$ group;

the number of substitutions, when the alkyl, alkylene, aryl, alkyloxy, polyoxyalkylene, and/or aryloxy is/are arbitrarily selectively substituted, is 1 or 2; and $R^6$ and $R^7$ are optionally linked together by cross-linking.

Specific examples of the (b) reducing phosphorus compound represented by General Formula (4) include phosphonate compounds and phosphinate compounds.

Examples of the phosphonate compounds include phosphonic acid, phosphonic acid alkyl esters, phosphonic acid aryl esters, and metal salts thereof. Specific examples thereof include dimethyl phosphonate, diethyl phosphonate, diphenyl phosphonate, and metal salts of phosphonic acid.

Examples of the phosphinate compounds include hypophosphorous acid, alkyl esters of hypophosphorous acid, aryl esters of hypophosphorous acid, alkylated hypophosphorous acid, arylated hypophosphorous acid, alkyl esters and aryl esters thereof, and metal salts thereof. Specific examples thereof include phosphinic acid, methyl phosphinate, ethyl phosphinate, propyl phosphinate, isopropyl phosphinate, butyl phosphinate, phenyl phosphinate, tolyl phosphinate, xylyl phosphinate, biphenylyl phosphinate, naphthyl phosphinate, anthryl phosphinate, alkyl esters and aryl esters thereof, and metal salts thereof.

From the viewpoint of suppressing oxidative deterioration of the thermoplastic polyester resin, suppressing oxidative deterioration of the (a) novolac epoxy resin represented by General Formula (1), and improving hydrolysis resistance of the molded article, metal salts of phosphorous acid and metal salts of hypophosphorous acid are preferred among these. Metal salts of hypophosphorous acid are more preferred. Sodium salt of hypophosphorous acid is especially preferred.

The amount of the (b) reducing phosphorus compound represented by General Formula (4) included is preferably 0.01 to 1 part by weight with respect to 100 parts by weight of the thermoplastic polyester resin. When the amount of the reducing phosphorus compound included is within the preferred range described above, the oxidative deterioration resistance can be effectively improved, and excellent mechanical properties and hydrolysis resistance tend to be obtained. Regarding the lower limit, the amount of the reducing phosphorus compound included is more preferably not less than 0.02 parts by weight, still more preferably not less than 0.05 parts by weight. Regarding the upper limit, the amount of the reducing phosphorus compound included is more preferably not more than 0.5 parts by weight, still more preferably not more than 0.3 parts by weight.

In the thermoplastic polyester resin composition (C), the (a) novolac epoxy resin represented by General Formula (1), and the (b) reducing phosphorus compound represented by General Formula (4), are preferably included to allow reactions to reduce carboxyl groups originally present in the thermoplastic polyester resin. This provides a first factor for giving hydrolysis resistance that has not been achieved by the conventional techniques. In view of this, the carboxyl group concentration in the thermoplastic polyester resin composition after melt kneading, that is, the concentration of carboxyl groups derived from the thermoplastic polyester resin, the concentration of carboxyl groups derived from the reaction product between the thermoplastic polyester resin and the (a) novolac epoxy resin represented by General Formula (1), and the concentration of carboxyl groups derived from the reaction product between the thermoplastic polyester resin and the (b) reducing phosphorus compound represented by General Formula (4), with respect to the total of the thermoplastic polyester resin, the reaction product between the thermoplastic polyester resin and the (a) novolac epoxy resin represented by General Formula (1), and the reaction product between the thermoplastic polyester resin and the (b) reducing phosphorus compound represented by General Formula (4), are preferably as low as possible, preferably not more than 20 eq/t, especially preferably not more than 15 eq/t. In a most preferred mode, the carboxyl group concentration is 0 eq/t.

The concentration of carboxyl groups derived from the thermoplastic polyester resin, the concentration of carboxyl groups derived from the reaction product between the thermoplastic polyester resin and the (a) novolac epoxy resin represented by General Formula (1), and the concentration of carboxyl groups derived from the reaction product between the thermoplastic polyester resin and the (b) reducing phosphorus compound represented by General Formula (4), with respect to the total of the thermoplastic polyester resin, the reaction product between the thermoplastic polyester resin and the (a) novolac epoxy resin represented by General Formula (1), and the reaction product between the thermoplastic polyester resin and the (b) reducing phosphorus compound represented by General Formula (4), in the thermoplastic polyester resin composition (C) can be calculated by dissolving the (A) thermoplastic polyester resin composition in an o-cresol/chloroform (2/1, vol/vol) mixed solution, and then subjecting the resulting solution to titration with 0.05 mol/L ethanolic potassium hydroxide using 1% bromophenol blue as an indicator. As described above, by including the (a) novolac epoxy resin represented by General Formula (1) in the thermoplastic polyester resin, the amount of carboxyl groups can be reduced. By further including the (b) reducing phosphorus compound represented by General Formula (4), oxidative deterioration of the thermoplastic polyester resin during melt kneading can be suppressed, to enable further reduction of the amount of carboxyl groups, which is preferred.

To provide a second factor to give hydrolysis resistance that has not been achieved by conventional techniques, carboxyl groups newly produced by hydrolysis of the thermoplastic polyester resin are preferably reacted with epoxy groups, to suppress an increase in carboxyl groups. In view of this, the epoxy group concentration in the thermoplastic polyester resin composition (C) after melt kneading is preferably not less than 20 eq/t, more preferably not less than 30 eq/t, especially preferably not less than 40 eq/t. When the epoxy group concentration in the thermoplastic polyester resin composition (C) is not more than 150 eq/t, higher levels of long-term hydrolysis resistance, residence stability at high temperature, and mechanical properties can be achieved at the same time, which is preferred. The concentration is more preferably not more than 130 eq/t. The epoxy group concentration in the thermoplastic polyester composition can be calculated by dissolving the thermoplastic polyester resin composition (C) in an o-cresol/chloroform (2/1, vol/vol) mixed solution, and then adding acetic acid and a triethylammonium bromide/acetic acid solution thereto, followed by performing potentiometric titration with 0.1 mol/L perchloric acid-acetic acid.

The thermoplastic polyester resin composition (C) is normally obtained by melt kneading. Representative examples of the melt kneading include a method in which raw materials are fed to a known normal melt kneading machine such as a single-screw extruder, double-screw extruder, banbury mixer, kneader, or mixing roll, followed by melt-kneading the materials at a processing temperature corresponding to the melt peak temperature of the resin composition +5 to 100° C. In this process, the order of mixing of the raw materials is not limited. The method may be any of a method in which all raw materials are mixed together and then melt-kneaded by the above method, a method in which part of the raw materials are mixed together and then melt-kneaded by the above method, followed by further mixing the other raw materials therewith and then melt-kneading the resulting mixture, and a method in which part of the raw materials are mixed together, and then the other raw materials are mixed therewith using a side feeder during melt kneading with a single-screw extruder or double-screw extruder.

Regarding additive components to be added in small amounts, these may be added after kneading and pelletizing the other components by the method described above or the like, but before the molding. For the purpose of modification, the following compounds may be included in the resin composition as long as the properties of the composition are not deteriorated: plasticizers such as polyalkylene oxide oligomer-based compounds, thioether-based compounds, ester-based compounds, and organic phosphorus-based compounds; crystal nucleating agents such as organic phosphorus compounds and polyether ether ketone; metal soaps such as montanic acid waxes, lithium stearate, and aluminum stearate; releasing agents such as ethylenediamine/stearic acid/sebacic acid polycondensates and silicone-based compounds; anti-coloring agents such as hypophosphite; phenolic antioxidants such as (3,9-bis[2-(3-(3-t-butyl-4-hydroxy-5-methylphenyl)propionyl oxy)-1,1-dimethylethyl]-2,4,8,10-tetraoxaspiro[5,5]undecane); phosphorus-based antioxidants such as (bis(2,4-dicumylphenyl)pentaerythritol-di-phosphite); and other ordinary additives such as water, lubricants, ultraviolet absorbers, coloring agents, and foaming agents. When the amount of any of the compounds exceeds 20% by weight in the entire composition, the original properties of the resin are deteriorated, which is not preferred. The amount is preferably not more than 10% by weight, more preferably not more than 1% by weight.

The fiber form of each stitching yarn using the thermoplastic resin (A) is a filament yarn. The filament yarn may be uniform in the longitudinal direction, or may have variation in its thickness. The cross-sectional shape of each fiber may be a round shape; a triangular shape; an L-shape; a T-shape; a Y-shape; a W-shape; an octofoil shape; a flat shape (with a flatness of about 1.3 to 4; such as a W-shape, an I-shape, a boomerang shape, a wave shape, a skewered-dumpling shape, a cocoon shape, or a rectangular parallelepiped shape); a polygonal shape such as a dog-bone shape; a multifoil shape; a hollow shape, or an irregular shape.

The yarn form of the stitching yarn using the thermoplastic resin (A) is a multifilament yarn or monofilament yarn. A multifilament is preferred.

In a multifilament yarn, its monofilament fineness is preferably 0.01 to 10 dtex, more preferably 0.1 to 10 dtex, especially preferably 0.5 to 5 dtex. In a monofilament yarn, its monofilament fineness is preferably 10 to 100,000 dtex. The total fineness is preferably 10 to 100,000 dtex, more preferably 30 to 50,000 dtex.

In the multiaxial fabric resin base material, in an early spinodal decomposition process due to curing reaction of the thermosetting epoxy resin (B) after the impregnation, formation of a both-phase continuous structure preferably occurs with an (A)-component or a (B)-component structural period of 0.001 to 0.1 μm, followed by development of a both-phase continuous structure having a structural period of 0.01 to 1 μm or a dispersion structure having an interparticle distance of 0.01 to 1 μm.

By controlling the both-phase continuous structure or the interparticle distance within the above-described range, excellent impact resistance and compression properties can be achieved.

For confirmation of the both-phase continuous structure or dispersion structure, it is preferred to confirm a regular periodical structure. This requires, for example, confirmation of the formation of the both-phase continuous structure by optical microscopy or transmission electron microscopy, and in addition, confirmation of appearance of a scattering maximum in scattering measurement performed using a small-angle X-ray scattering device or a light scattering device. The presence of the scattering maximum in the scattering measurement demonstrates the presence of a regular phase separation structure having a certain period. In a both-phase continuous structure, the period $\Lambda m$ (nm) corresponds to the structural period and, in a dispersion structure, it corresponds to the interparticle distance. The value can be calculated according to Equation (1) using the wavelength $\lambda$ (nm) of the scattered light in the scattering medium, and the scattering angle $\theta m$ (deg) which gives the scattering maximum:

$$\Lambda m = (\lambda/2)/\sin(\theta m/2) \quad (1).$$

Even when the structural period in the both-phase continuous structure or the interparticle distance size in the dispersion structure is within the range described above, if there is a coarse portion or the like in a part of the structure, the original properties cannot be obtained in some instances since, for example, the portion acts as the origin of destruction when an impact is applied. Thus, uniformity is important for the structural period in the both-phase continuous structure or the interparticle distance in the dispersion structure. The uniformity can be evaluated by the above-described small-angle X-ray scattering measurement or light scattering measurement.

The early spinodal decomposition process is defined as follows.

In spinodal decomposition, when the temperature of a uniformly compatible mixture system once prepared at a temperature within a compatible range is rapidly changed to a temperature within an unstable range, the system rapidly begins phase separation toward a coexistence composition. In this process, the concentration is monochromatized to a constant wavelength, and the two separated phases are continuously and regularly intertwined with each other at the structural period ($\Lambda_m$) (unit, nm), to form a both-phase continuous structure. After formation of the both-phase continuous structure, only the difference in the concentration increases between the two phases while the structural period is kept constant. This process is referred to as the early spinodal decomposition process.

The structural period ($\kappa_m$) (unit, nm) in the early spinodal decomposition process has the following thermodynamic relationship:

$$\kappa_m \sim [|T_s - T|/T_s]^{-1/2} \text{(wherein } T_S \text{ represents a temperature on the spinodal curve).}$$

In spinodal decomposition, such an early process is followed by a middle process in which both an increase in the wavelength and an increase in the concentration difference simultaneously occur, a late process in which the wavelength increases self-similarly after the concentration difference reaches the coexistence composition, and finally, macroscopic separation into two phases. The structure may be fixed in the stage at which a desired structural period is achieved before the final macroscopic separation into two phases.

The multiaxial fabric base material means a fabric comprising a laminated body (multiaxial fabric base material) comprising sheets of unidirectionally aligned fiber bundles, the sheets being layered at different angles, the laminated body being penetrated in the thickness direction by stitching yarns composed of a thermoplastic resin (A), and being stitched such that the yarns reciprocate along the surface direction between the front surface and the back surface of the laminated body. The stitching yarns for stitching of the multiaxial fabric base material may be yarns having a sheath-core structure using a stitching yarn of the thermoplastic resin (A) as the core portion, and using a yarn of a low-melting-point polymer as the sheath portion, which stitching yarn may be melted by heat molding.

To avoid surface roughness caused by the stitching, the multiaxial fabric base material may be laminated with a porous thermoplastic resin layer(s) (including films and non-woven fabrics in which penetrating holes that allows passage of a resin are formed) (wherein one or more layers are disposed on one side, on both sides, and/or between layers of the multiaxial fabric base material), and the resulting laminate may be integrated by stitching with stitching yarns. Alternatively, a sheet(s) of unidirectionally aligned reinforcing fibers (including those prepared by thermal fusion of the thermoplastic resin sheet(s) to one or both sides of the reinforcing fiber sheet) may be adhered and bound to one or both surfaces of the multiaxial fabric base material with a resin, and the resulting laminate may be integrated by stitching with stitching yarns.

The term "porous" means a shape in which holes are formed in the thickness direction on a plane. Such a shape not only secures channels for the matrix resin and air in the thickness direction of the multiaxial fabric base material, but also enables, because of linkage in the planar direction, improvement of the width stability in reinforcing fiber yarns, and improvement of the shape stability of the base material in a reinforcing fiber yarn group or cloth. Examples of resin materials for forming such a porous thermoplastic resin layer include those having a non-woven fabric shape, mat shape, mesh shape, woven fabric shape, knitted fabric shape, short-fiber group shape, punched film shape, and porous film shape. Among these, non-woven fabrics, mats, and meshes are preferred since they can be inexpensively obtained, and since the above effects can be efficiently produced because of their channels for the matrix resin and air, which channels are formed also in the planar direction. When the resin material is a non-woven fabric, the fiber diameter of the component fibers is preferably not less than 1 μm and less than 100 μm, more preferably not less than 5 μm and less than 80 μm, still more preferably not less than 10 μm and less than 60 μm. When the fiber diameter is within the preferred range, the surface area of the resin material is small so that the resin flow is not inhibited in the later-mentioned resin impregnation step. On the other hand, when an FRP is prepared therefrom, the thickness between reinforcing fiber base material layers can be small so that the fiber volume fraction (Vf) is less likely to be lowered.

The porous thermoplastic resin layer may be prepared using one or more resins selected from the group consisting of polyamide, polypropylene, polysulfone, polyetherimide, polyethersulfone, polyetherketone, polyether ether ketone, aromatic polyamide, aromatic polyester, polyarylene sulfide, aromatic polycarbonate, polyarylene oxide, thermoplastic polyimide, polyamide imide, polybutylene terephthalate, polyethylene terephthalate, and polyethylene. In some applications, a thermosetting resin may be partially mixed therewith. From the viewpoint of heat resistance, strength, and sheet processability, polyamide, aromatic polyamide, polyarylene sulfide, or polyether imide is especially preferably used.

The porous thermoplastic resin layer has an areal weight of preferably 5 to 50 $g/m^2$, more preferably 10 to 30 $g/m^2$. When the areal weight of the porous thermoplastic resin layer is not less than 5 $g/m^2$, a sufficient toughness-improving effect can be obtained. Further, when the areal weight of the thermoplastic resin layer is not more than 50 $g/m^2$, the ratio of fibers other than reinforcing fibers in the carbon fiber-reinforced composite can be reduced so that deterioration of mechanical properties such as the strength and the elastic modulus can be suppressed.

When the multiaxial fabric base material is used as a laminate, it is preferably selected such that plane symmetry is achieved. The multiaxial fabric base material has an areal weight of preferably 10 to 2,000 $g/m^2$, especially preferably 50 to 1,500 $g/m^2$. Preferred examples of the multiaxial fabric base material include [+45°/−45°/−45°/+45° ], [0°/−45°/−45°/0° ], [0°/+45°/−45°/−45°/+45°/0°], and [0°/+45°/90°/−45°/−45°/90°/+45°/0°].

Examples of the multiaxial fabric base material combination whose laminate exhibits plane symmetry include [+45°/−45° ] and [−45°/+45° ]; [0°/+45°/−45° ] and [−45°/+45°/0° ]; and [0°/+45°/−45°/90° ] and [90°/−45°/+45°/0° ]. 0°, +45°, −45°, and 90° represent the lamination angles of the layers constituting the multiaxial fabric base material, and each of these indicates that the fiber axis direction of the unidirectionally aligned fiber bundles is 0°, +45°, −45°, or 90°, respectively, with respect to the length direction of the fabric. The lamination angle is not limited to these angles, and may be an arbitrary angle.

The fibers constituting the fiber bundles of the multiaxial fabric are not limited as long as they are a fiber reinforcing material. Examples of the fibers include carbon fibers, glass fibers, aramid fibers, boron fibers, and metal fibers. Use of inorganic fibers such as carbon fibers or glass fibers is especially preferred.

Carbon Fiber Yarns

The carbon fiber yarns preferably have a tensile elastic modulus of not less than 200 GPa and a tensile strength of not less than 4.5 GPa since such carbon fiber yarns not only have high strength and a high elastic modulus, but also have excellent impact resistance. The thickness of the carbon fiber yarns is not limited, and is preferably 550 dtex to 27,000 dtex, more preferably 550 dtex to 23,000 dtex. The number of filaments per carbon fiber yarn is about 1,000 when the thickness is 550 dtex, and about 400,000 when the thickness is 270,000 dtex.

The carbon fiber yarns may contain a resin component adhering thereto as a fixing material to fix carbon fiber layers together, or fix the carbon fiber yarns together. As the fixing material, a heat-melting resin whose viscosity decreases upon heating may be used. Examples of the fixing material include: (i) crystalline thermoplastic resins such as polyesters including polyethylene terephthalate, polybutylene terephthalate, polytrimethylene terephthalate, polyethylene naphthalate, and liquid crystal polyesters; polyolefins including polyethylene, polypropylene, and polybutylene; polyoxymethylene; polyamide; polyarylene sulfides including polyphenylene sulfide; polyketone; polyether ketone; polyether ether ketone; polyether ketone; polyether nitrile; fluorine resins including polytetrafluoroethylene; and liquid crystal polymers; (ii) amorphous thermoplastic resins such as styrene resins, polycarbonate, polymethyl methacrylate, polyvinyl chloride, polyphenylene ether, polyimide, polyamide imide, polyether imide, polysulfone, polyether sulfone, and polyarylate; and further, (iii) thermoplastic elastomers such as polystyrene-based, polyolefin-based, polyurethane-based, polyester-based, polyamide-based, polybutadiene-based, polyisoprene-based, fluororesin, and acrylonitrile-based thermoplastic elastomers; as well as copolymers and modified products of the polymers exemplified in (i) to (iii); and further, phenol resins, phenoxy resins, epoxy resins, and blended resins of two or more of these resins. Depending on the desired application, the exemplified resin components may be mixed with an additive(s) such as a filler, a conductivity-imparting material, a flame retardant, and/or a flame retardant aid.

When the multiaxial fabric base material is to be applied to a mold having a complex shape without forming wrinkles, that is, when the multiaxial fabric base material is adapted to a mold having a complex shape, the fiber position may partially shift on a curved surface of the mold, or the crossing angle of the carbon fibers may change. Thus, the multiaxial fabric base material preferably has freedom of deformation. For example, when the thermoplastic resin sheet has, for example, a paper or film shape instead of a non-woven-fabric shape, the sheet has only a low degree of freedom of deformation that may result in formation of wrinkles on the carbon fiber laminate base material when the sheet is applied to a curved portion. If wrinkles are formed on the base material, the reinforcing fibers are bent in the wrinkled portion. Therefore, when the carbon fiber-reinforced composite is formed, the wrinkled portion is weak, and the portion acts as the origin of destruction, which is not preferred.

Multiaxial Fabric Laminate Base Material

The multiaxial fabric laminate base material may comprise: at least two fiber layers laminated; and a thermoplastic resin sheet in which a net-like thermoplastic resin is formed between the fiber layers.

The term "comprise(s) a thermoplastic resin sheet in which a net-like thermoplastic resin is formed between the fiber layers" includes not only when the fiber layers and the thermoplastic resin sheet are simply laminated together, but also when the fiber layers and the thermoplastic resin sheet are integrated together by carrying out at least one of heating and pressurization. Examples of the method of the integration include (i) a heating method using an oven, infrared heater or the like, or a heating method by irradiation with laser light; (ii) a heating method in which the carbon fiber yarns are directly caused to generate heat by electromagnetic induction heating or electric heating; and (iv) a pressurization method using an indenter or roller on a flat plate.

As a method of integrating the fiber yarns and the thermoplastic resin sheet together, a method in which at least part of the carbon fiber layers and the thermoplastic resin are stitched with stitching yarns is preferably employed. This method enables suppression of disturbance of the fiber orientation of the fiber yarns, suppression of disturbance of intervals between the fiber yarns, and disturbance in shaping of the multiaxial fabric laminate base material. Furthermore, since the method enables modification of the cross-sectional shape of the fiber yarns, resin impregnation channels can be formed in the fiber layers.

Integration of the fiber yarns in the fiber layers with the thermoplastic resin sheet may be partial fixation rather than total integration of the fiber yarn surfaces. By this, binding of the fiber yarns by the thermoplastic resin sheet can be loosened and, as a result, the multiaxial fabric laminate base material can be easily shaped into a desired mold shape. Examples of the method of the partial fixation include a method using an indenter or roller on a flat plate, which indenter or roller has protruding portions arranged in a grid-like pattern.

Further, as a method of integrating the fiber yarns with the thermoplastic resin sheet, a method in which the carbon fiber layers and the thermoplastic resin sheet are mechanically integrated together by needle punching, or by punching with a fluid such as air or water, may be used. The method of integrating the fiber layers and the thermoplastic resin sheet together may be a combination of these methods selected in accordance with the desired shape and physical properties of the multiaxial fabric laminate base material or the carbon fiber-reinforced composite.

Preform

A three-dimensional shape may be given to the multiaxial fabric laminate base material using a shaping mold, jig or the like such that the given shape conforms to the shape of the fiber-reinforced resin molded article of interest, and the shape of the multiaxial fabric laminate base material may be fixed. In particular, when the mold has a three-dimensional shape, disturbance of fibers and formation of wrinkles during mold clamping, resin injection, or resin impregnation can be easily suppressed by the fixation of the shape of the multiaxial fabric laminate base material.

Fiber-Reinforced Composite

The fiber-reinforced resin molded article can be obtained by impregnating the multiaxial fabric laminate base material or the preform with a matrix resin by an injection molding method.

Examples of the injection molding method include RTM (Resin Transfer Molding), VaRTM (Vacuum Assist Resin Transfer Molding), and RFI (Resin Film Infusion).

Method of Evaluation of Areal Weight

The areal weight ($W$ [$g/m^2$]) of the multiaxial fabric base material and the thermoplastic resin sheet is calculated according to Steps (1) to (3):

Step (1): Ten square test pieces of 100 mm×100 mm are cut out from the multiaxial fabric base material and the thermoplastic resin sheet formed into a sheet shape. In this process, the pieces are cut out from at least three portions, which are both end portions and the center portion, from the multiaxial fabric base material and the thermoplastic resin sheet formed into a sheet shape to avoid uneven distribution of the positions for the cutting out.

Step (2): The mass of each cut square test piece (wn [g]) is measured, and divided by the area of the test piece (0.01 m$^2$), to calculate the mass per unit area (Wn [g/m$^2$]).

Step (3): The arithmetic mean of the mass per unit area of each test piece is calculated to provide the areal weight of the thermoplastic resin layer (W [g/m$^2$]).

EXAMPLES

Our materials and methods are described below more concretely by way of Examples. However, this disclosure is not limited to the descriptions in the Examples. In the Examples and Comparative Examples, physical properties were evaluated according to the following methods.

Volume Fraction (Vf)

The mass of the fiber-reinforced resin base material, W0, obtained in each of the Examples and Comparative Examples was measured, and the fiber-reinforced resin base material was heated in air at 550° C. for 240 minutes to burn off the resin component. The mass of the residual reinforcing fibers, W1, was measured, and the reinforcing fiber volume fraction (Vf) in the fiber-reinforced resin base material was calculated according to Equation (VI):

$$Vf(vol\%) = (W1/\rho f) / \{W1/\rho f + (W0-W1)/\rho 1\} \times 100 \quad (VI).$$

ρf represents the reinforcing fiber density (g/cm$^3$).

Melting Point

Using a differential scanning calorimeter (DSC Q20) manufactured by TA Instruments, 5 to 7 mg of the resin composition obtained in each of Examples and Comparative Examples was weighed, and heated under a nitrogen atmosphere from 20° C. to 250° C. at a heating rate of 20° C./min. The top of the endothermic peak that appeared during the heating was regarded as Tm (melting point).

Polymer Mechanical Properties (Tensile Strength and Tensile Elongation)

Using an injection molding machine SE75DUZ manufactured by Sumitomo Heavy Industries, Ltd., the (A) thermoplastic polyester resin composition was subjected to injection molding under temperature conditions with a molding temperature of the melting point +30° C. and a mold temperature of 80° C., under molding cycle conditions with a total of the injection time and the pressure holding time of 10 seconds, and with a cooling time of 10 seconds, to obtain ASTM Type-1 dumbbell test pieces having a test piece thickness of ⅛ inches (about 3.2 mm) for evaluation of tensile physical properties. Using the test pieces for evaluation of tensile physical properties obtained, the maximum tensile strength point (tensile strength) and the maximum tensile elongation point (tensile elongation) were measured according to ASTM D638 (2005). The average of five measured values was employed. The higher the values of tensile strength and tensile elongation, the better the toughness of the material.

Polymer Long-Term Hydrolysis Resistance (Tensile Strength Retention Rate)

Using an injection molding machine SE75DUZ manufactured by Sumitomo Heavy Industries, Ltd., ASTM Type-1 dumbbell test pieces having a test piece thickness of ⅛ inches (about 3.2 mm) for evaluation of tensile physical properties were obtained under the same injection molding conditions as the conditions for the preparation of the above-described test pieces for evaluation of tensile physical properties. The ASTM Type-1 dumbbells obtained were placed in a highly accelerated stress test chamber EHS-411 manufactured by ESPEC CORP. whose temperature and humidity were set to 121° C.×100% RH, where moist heat treatment was carried out for 120 hours (5 days). The molded article after the moist heat treatment was subjected to measurement of the maximum tensile strength point under the same conditions as in the above-described tensile test, and the average of five measured values was calculated. From the maximum tensile strength point after the moist heat treatment and the maximum tensile strength point before the moist heat treatment, the tensile strength retention rate was calculated according to the following equation:

Tensile strength retention rate (%)=(maximum tensile strength point after moist heat treatment/maximum tensile strength point before moist heat treatment)×100.

Carboxyl Group Concentration

The concentration of carboxyl groups derived from the thermoplastic polyester resin, the concentration of carboxyl groups derived from the reaction product between the thermoplastic polyester resin and the (a) novolac epoxy resin represented by General Formula (1), and the concentration of carboxyl groups derived from the reaction product between the thermoplastic polyester resin and the (b) reducing phosphorus compound represented by General Formula (4), with respect to the total of the thermoplastic polyester resin, the reaction product between the thermoplastic polyester resin and the (a) novolac epoxy resin represented by General Formula (1), and the reaction product between the thermoplastic polyester resin and the (b) reducing phosphorus compound represented by General Formula (4), in the thermoplastic polyester resin composition (C) were calculated by dissolving 2 g of the resin composition in 50 mL of an o-cresol/chloroform (2/1, vol/vol) mixed solution, and then subjecting the resulting solution to titration with 0.05 mol/L ethanolic potassium hydroxide using 1% bromophenol blue as an indicator, followed by calculating the carboxyl group concentration in the composition, and multiplying the calculated concentration by the mixing ratio of the thermoplastic polyester resin.

Epoxy Group Concentration

The epoxy group concentration in the thermoplastic polyester composition (C) was calculated by dissolving 2 g of the resin composition in 30 mL of an o-cresol/chloroform (2/1, vol/vol) mixed solution, and then adding 20 mL of acetic acid and 10 mL of 20 wt % triethylammonium bromide/acetic acid solution thereto, followed by performing potentiometric titration with 0.1 mol/L perchloric acid-acetic acid.

Polymer Heat Deterioration Resistance (Carboxyl Group Concentration Increasing Rate Using an injection molding machine SE75DUZ manufactured by Sumitomo Heavy Industries, Ltd., ASTM Type-1 dumbbell test pieces having a test piece thickness of ⅛ inches (about 3.2 mm) for evaluation of tensile physical properties were obtained under the same injection molding conditions as the conditions for the preparation of the above-described test pieces for evaluation of tensile physical properties. To perform oxidative deterioration treatment, the ASTM Type-1 dumbbells obtained were left to stand for 15 minutes on aluminum foil placed in a hot air oven PVH-222 manufactured by ESPEC CORP. whose temperature was set to 270° C. The dumbbells were then removed therefrom. The removed test pieces were allowed to cool to room temperature, and then the carboxyl group concentration was measured under the same conditions as described above.

From the carboxyl group concentration in the molded article after the oxidative deterioration and the carboxyl group concentration in the untreated molded article, the carboxyl group concentration increasing rate was calculated according to the following equation:

Carboxyl group concentration increasing rate (%)= (carboxyl group concentration in molded article after oxidative deterioration treatment−carboxyl group concentration in untreated molded article)/carboxyl group concentration in untreated molded article×100.

When the material has a carboxyl group concentration increasing rate of not more than 70%, the material can be said to have excellent oxidative deterioration resistance. When the rate is not more than 3.0%, the material can be said to have especially excellent oxidative deterioration resistance.

Polymer Bleed Out Resistance

Using an injection molding machine SE75DUZ manufactured by Sumitomo Heavy Industries, Ltd., ASTM Type-1 dumbbell test pieces having a test piece thickness of ⅛ inches (about 3.2 mm) for evaluation of bleed out were obtained under the same injection molding conditions as the conditions for the preparation of the above-described test pieces for evaluation of tensile physical properties. The ASTM Type-1 dumbbells obtained were placed in a highly accelerated stress test chamber EHS-3.11 manufactured by ESPEC CORP. whose temperature and humidity were set to 121° C.×100% RH, where moist heat treatment was carried out for 120 hours (5 days). The external appearance of the molded article after the moist heat treatment was visually observed, and bleed out was judged according to the following standard.

Good: No liquid-like or white-powder-like bleed out was found in the molded article.

Fair: Liquid-like or white-powder-like bleed out was found in part of the molded article.

Poor: Liquid-like or white-powder-like bleed out was found in various portions of the molded article.

Multiaxial Fabric Laminate Base Material

A laminate of a multiaxial fabric base material having an areal weight of 200 g/m$^2$ using carbon fibers, wherein long fibers are unidirectionally aligned, was prepared into the configuration of a quasi-isotropic laminate [45°/0°/−45°/90°]3, (24 layers; "3s" means a mode in which three groups of layers (8 layers×3=24 layers) are laminated, wherein each group of layers are composed of layers laminated at the orientation angles shown in "[ ]" in this order and layers arranged symmetrically thereto (4 layers×2=8 layers); the same applies thereafter) using an AFP apparatus, and PA6 non-woven fabric (areal weight, 30 g/m$^2$) was inserted therebetween, followed by integrating the resulting laminate together by stitching with stitching yarns processed by spinning from a thermoplastic resin (A).

Subsequently, the multiaxial fabric laminate base material was placed on a planar preform mold, and then sealed with a bag film and a sealant, followed by heating in an oven at 90° C. for 1 hour in an evacuated state. After removal from the oven, the preform mold was allowed to cool to room temperature, and then the pressure was released to obtain a multiaxial fabric laminate base material.

Multiaxial Fabric Resin Base Material/Bending Test

A resin dispersion medium (aluminum wire gauze) was layered on the multiaxial fabric laminate base material obtained, and a cavity was formed by sealing with a planar mold and a bag material using a sealant, followed by placing the material in an oven at 100° C. After the temperature of the reinforcing fiber laminate base material reached 100° C., the pressure of the sealed cavity was reduced for evacuation, and the thermosetting resin (B) was injected thereto utilizing only the pressure difference from atmospheric pressure while the temperature of the resin was kept at 100° C. After impregnating the material with the thermosetting resin (B), the temperature was increased to 180° C. while reducing the pressure, followed by curing the resin by leaving it to stand for 2 hours. By demolding, a multiaxial fabric resin base material with a carbon fiber content Vf=50% was obtained. Subsequently, five bending-test pieces (15 mm (width)×100 mm (length)×2 mm (thickness)) were cut out therefrom, and subjected to measurement of the bending strength and the bending elastic modulus (n=5, for each) using a 5-kN universal material tester (Instron 5565) in the three-point bending mode with a test speed of 5 mm/minute and a span distance of 80 mm. Values calculated in terms of Vf 50% were employed. Their higher values indicate that the fiber-reinforced composite has higher strength and higher rigidity.

Multiaxial Fabric Resin Base Material/Long-Term Hydrolysis Resistance

Bending-test pieces obtained by the same method as described above were placed in a highly accelerated stress test chamber EHS-3.11 manufactured by ESPEC CORP. whose temperature and humidity were set to 121° C.×100% RH, where moist heat treatment was carried out for 120 hours (5 days). Thereafter, a bending test was carried out under the same test conditions as in the method described above, to measure the bending strength and the bending elastic modulus (n=5, for each). Values calculated in terms of Vf 50% were employed. Their higher values indicate that the fiber-reinforced composite has better hydrolysis resistance.

Multiaxial Fabric Resin Base Material/CAI Test

A test piece (100 mm (width)×150 mm (length)×4 mm (thickness)) was cut out from a multiaxial fabric resin base material (Vf 50%) obtained by the same method as described above, and subjected to a CAI (compressive strength at normal temperature after impact) test according to ASTM D7136 and ASTM D7137. In this test, the impact energy was set to 270 inch-pound (≈30.5 J).

Raw Materials

In the Examples and Comparative Examples, the following raw materials were used.

Reference Example 1: Thermoplastic Resin

The following resins were used as thermoplastic polyester resins in the Examples.

PBT-1: Polybutylene terephthalate resin (manufactured by Toray Industries, Inc.; carboxyl terminal group concentration, 30 eq/t; melting point, 220° C.)

PET-1: Polyethylene terephthalate resin (manufactured by Toray Industries, Inc.; carboxyl terminal group concentration, 40 eq/t; melting point, 260° C.)

CoPBT-1:

A copolymerized polybutylene terephthalate (CoPBT-1; melting point, 190° C.) was prepared such that it contains: (i) 34.5 mol % terephthalic acid, 9.2 mol % isophthalic acid, and 6.3 mol % adipic acid as acid components; and (ii) 41.8 mol % butanediol and 8.2 mol % ethylene glycol as diol components.

CoPBT-2:

A copolymerized polybutylene terephthalate (CoPBT-2; melting point, 200° C.) was prepared such that it contains: (i) 50.0 mol % terephthalic acid as an acid component; and (ii) 22.7 mol % butanediol, 0.9 mol % ethylene glycol, 13.3 mol % diethylene glycol, and 13.1 mol % polyethylene glycol as diol components.

The following resins were used as thermoplastic resins in the Comparative Examples.

PP: Polypropylene resin (manufactured by Japan Polypropylene Corporation; NOVATEC SA3A; melting point, 160° C.)

PC: Polycarbonate resin (manufactured by Mitsubishi Chemical Corporation; Iupilon ML200; glass transition temperature, 150° C.)

PS: Polystyrene resin (manufactured by PS Japan Corporation; GPPS679; glass transition temperature, 70° C.)

Reference Example 2: (a) Novolac Epoxy Resin Represented by General Formula (1)

(a-1) Novolac Epoxy Resin (Manufactured by Nippon Kayaku Co., Ltd.; Product Name, XD-1000; Epoxy Equivalent, 253 g/Eq)

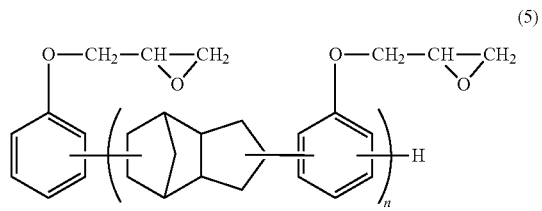

(5)

In General Formula above, n represents a value of 1 to 3.

Reference Example 3: (a') Novolac Epoxy Resin Other than General Formula (1)

(a'-1) Novolac Epoxy Resin (Manufactured by Nippon Kayaku Co., Ltd.; Product Name, EOCN-1025; Epoxy Equivalent, 211 g/Eq)

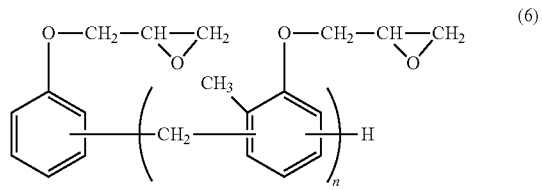

(6)

In General Formula above, n represents a value of 3 to 5.

Reference Example 4: (b) Reducing Phosphorus Compound Represented by General Formula (4)

(b-1) Disodium Phosphite (Tokyo Chemical Industry Co., Ltd.)

Reference Example 5: (b') Phosphorus Compound Other than Reducing Phosphorus ComPound Represented by General Formula (4)

(b'-1) 2-Carboxylethyl(Phenyl)Phosphinic Acid (Tokyo Chemical Industry Co., Ltd.)

Reference Example 6: Fiber Yarns Used for Multiaxial Fabric Base Material

CF-1: Carbon Fiber Yarn (Manufactured by Toray Industries, Inc.; "TORAYCA" (Registered Trademark) T800SC; Fineness, 10,300 Dtex; Filament Number, 24,000)

Reference Example 7: Thermoplastic Resin Used for Thermoplastic Resin Sheet

PA6: Nylon Resin (Manufactured by Toray Industries, Inc.; "AMILAN" (Registered Trademark) CM1007; Melting Point, 225° C.)

Reference Example 8: Thermosetting Resin (B)

To 100 parts by weight of the following main liquid, 39 parts by weight of the following curing liquid was added, and the resulting mixture was uniformly stirred at 80° C. to obtain an epoxy resin composition. The solubility parameter was 11.0; the viscosity according to an E-type viscometer at 80° C. was 55 mPa·s; the viscosity at Hour 1 was 180 mPa·s; the glass transition temperature after curing at 180° C. for 2 hours was 197° C.; and the bending elastic modulus was 3.3 GPa. The thermosetting resin had a resin impregnation temperature of 180° C.

Main liquid: As epoxy, 40 parts by weight of a tetraglycidyldiaminodiphenylmethane-type epoxy ("ARALDITE" (registered trademark) MY-721; epoxy equivalent, 112; manufactured by HUNTSMAN JAPAN), 35 parts by weight of a liquid bisphenol A-type epoxy resin ("EPON" (registered trademark) 825; epoxy equivalent, 170 to 180; manufactured by Mitsubishi Chemical Corporation), 15 parts by weight of diglycidylaniline (GAN, manufactured by Nippon Kayaku Co., Ltd.), and 10 parts by weight of a triglycidylaminophenol-type epoxy resin ("j ER" (registered trademark) 630; epoxy equivalent, 98; manufactured by Mitsubishi Chemical Corporation) were weighed, and stirred at 70° C. for 1 hour to obtain a uniform solution.

Curing liquid: 70 parts by weight of a modified aromatic polyamine ("jERCURE" (registered trademark) W, manufactured by Mitsubishi Chemical Corporation), 20 parts by weight of 3,3'-diaminodiphenylsulfone (manufactured by MITSUI FINE CHEMICALS, Inc.), and 10 parts by weight of 4,4'-diaminodiphenylsulfone ("SEIKACURE" S, manufactured by Seika Corporation) were weighed, and uniformly stirred at 100° C. for 1 hour, followed by allowing the resulting mixture to cooled to 70° C. As a curing accelerator, 2 parts by weight of t-butylcatechol (DIC-TBC, manufactured by DIC Corporation) was weighed, and then uniformly dissolved by stirring at 70° C. for 30 minutes.

Examples 1 to 9 and Comparative Examples 1 to 4: Production Method for Thermoplastic Resin (A) Pellets The raw materials shown in Table 1, other than the carbon fiber yarns, were dry-blended at the ratios shown in Table 1, and melt-kneaded in a TEX 30a biaxial extruder equipped with a vacuum bent, manufactured by The Japan Steel Works, LTD. (screw diameter, 30 mm; L/D=45; five kneading sections; fully intermeshing screws rotating in the same direction), with a screw rotation rate of 300 rpm and a discharge rate of 20 kg/hr while the cylinder temperature was set such that the resin temperature at the orifice of the die was the resin composition melting point +20° C. The melt-kneaded product was pelletized using a strand cutter, and then subjected to the evaluations.

TABLE 1

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Thermoplastic Resin Composition (C) | Thermoplastic Resin (A) | Resin Component | PBT-1 | PET-1 | CoPBT-1 | CoPBT-2 | PET-1 | PET-1 | PET-1 | PET-1 | — | PP | PC | PS |
| | | Resin Component Amount | 100 | 100 | 100 | 100 | 100 | 100 | 100 | 100 | — | 100 | 100 | 100 |
| | Novolac Epoxy Resin (a) | (a) Component | a-1 | a-1 | — | — | a-1 | — | a-1 | — | — | — | — | — |
| | | (a) Component Amount*1 | 2.0 | 2.0 | — | — | 2.0 | — | 2.0 | — | — | — | — | — |
| | Novolac Epoxy Resin (a') | (a') Component | — | — | — | — | — | — | — | a'-1 | — | — | — | — |
| | | (a') Component Amount*1 | — | — | — | — | — | — | — | 2.0 | — | — | — | — |
| | Reductiveness Phosphorous Compound (b) | (b) Component | b-1 | b-1 | — | — | — | b-1 | — | — | — | — | — | — |
| | | (b) Component Amount*1 | 0.1 | 0.1 | — | — | — | 0.1 | — | — | — | — | — | — |
| | Reductiveness Phosphorous Compound (b') | (b') Component | — | — | — | — | — | — | b'-1 | b'-1 | — | — | — | — |
| | | (b') Component Amount*1 | — | — | — | — | — | — | 0.1 | 0.1 | — | — | — | — |
| Thermoplastic Resin Sheet | Non-woven Fabric | Polymer Component | PA6 | PA6 | PA6 | PA6 | PA6 | PA6 | PA6 | PA6 | PA6 | PA6 | PA6 | PA6 |
| | | Areal Weight g/m² | 30 | 30 | 30 | 30 | 30 | 30 | 30 | 30 | 30 | 30 | 30 | 30 |
| Fiber Sheet | CF-1 (T800SC) | Vf % | 50 | 50 | 50 | 50 | 50 | 50 | 50 | 50 | 50 | 50 | 50 | 50 |
| Multiaxial Fabric Resin Base Material | | Softening Point of Thermoplastic Resin (A) °C. | 223 | 260 | 190 | 200 | 260 | 260 | 260 | 260 | — | 160 | 150 | — |
| | | Impregnation Temperature of Thermosetting Resin (B) °C. | 180 | 180 | 180 | 180 | 180 | 180 | 180 | 180 | 180 | 180 | 180 | 180 |
| Properties of Thermoplastic Polyester Resin Composition (C) Used for Stitching Yarn | | Tensile Strength MPa | 60 | 54 | 49 | 48 | 53 | 54 | 52 | 53 | — | 36 | 60 | 40 |
| | | Tensile Elongation % | 5.0 | 4.6 | 5.5 | 5.7 | 4.9 | 3.8 | 4.1 | 3.9 | — | 20.0 | 100.0 | 2.0 |
| | | Long-Term Hydrolysis Resistance*3 % | 72 | 67 | 20 | 19 | 45 | 17 | 13 | 40 | — | 90 | 35 | 90 |
| | | Carboxyl Group Concentration eq/t | 10 | 13 | 15 | 17 | 12 | 18 | 15 | 12 | — | — | — | — |
| | | Heat Deterioration % | 39 | 52 | 125 | 125 | 127 | 80 | 180 | 45 | — | — | — | — |
| | | Resistance*4 eq/t | 50 | 55 | 45 | 48 | 52 | 12 | 13 | 49 | — | — | — | — |
| | | Epoxy Group Concentration | | | | | | | | | | | | | |
| | | Bleed out Resistance (Moist Heat Treatment) | good | good | good | good | good | fair | good | good | — | — | — | — |

TABLE 1-continued

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Mechanical Properties of Multiaxial Fabric Laminate Resin Base Material | Bending Elastic Modulus (RT*6) | GPa | 45 | 42 | 42 | 44 | 43 | 43 | 43 | 42 | 40 | 40 | 44 | 40 |
| | CV | % | 4 | 4 | 5 | 6 | 4 | 4 | 4 | 4 | 4 | 6 | 5 | 5 |
| | Bending Elastic Modulus (PCT Treatment) | GPa | 43 | 39 | 35 | 33 | 35 | 34 | 33 | 34 | 39 | 39 | 40 | 38 |
| | CV | % | 4 | 4 | 5 | 5 | 4 | 4 | 4 | 4 | 5 | 5 | 6 | 5 |
| | Bending Strength (RT*6) | MPa | 550 | 520 | 500 | 490 | 520 | 520 | 525 | 520 | 350 | 450 | 450 | 440 |
| | CV | % | 5 | 4 | 5 | 4 | 4 | 4 | 4 | 4 | 5 | 5 | 5 | 5 |
| | Bending Strength (PCT Treatment) | MPa | 505 | 490 | 430 | 420 | 470 | 450 | 452 | 495 | 340 | 420 | 350 | 425 |
| | CV | % | 4 | 4 | 4 | 4 | 4 | 4 | 4 | 4 | 5 | 7 | 6 | 6 |
| | CAI*5 | MPa | 200 | 190 | 200 | 150 | 189 | 188 | 190 | 190 | 110 | 115 | 121 | 112 |
| | CV | % | 5 | 6 | 6 | 7 | 6 | 5 | 5 | 5 | 12 | 10 | 5 | 11 |

*1Mixed amount with respect to total 100 parts by weight of Polyester component,
*2Vf: Reinforcing fiber volume in Multiaxial Fabric Laminate Resin Base Material,
*3Long-Term Hydrolysis Resistance: Strength Retention Rate,
*4Heat Deterioration Resistance: Carboxyl group concentration increasing rate,
*5CAI: Compressive strength at normal temperature after Impact,
*6RT: Room Temperature,
*7PHR: Parts by weight Based on a comparison between the Examples and Comparative Examples, it can be seen that the multiaxial fabric laminate resin base material comprising: the stitching yarns composed of the thermoplastic resin (A); and the thermosetting resin (B); can have impregnation properties, high durability (hydrolysis resistance and heat deterioration resistance), and composite-material dynamic properties (mechanical properties, CAI) in a well-balanced manner.

INDUSTRIAL APPLICABILITY

Taking advantage of the excellent properties, the multiaxial fabric, and composite materials using it, can be used for applications such as aircraft parts, automobile parts, electric or electronic parts, building components, containers, daily necessaries, miscellaneous daily goods, and sanitary articles. Fiber-reinforced resin base material and molded articles thereof can be used especially preferably for peripheral parts for aircraft engines, exterior parts for aircraft parts, automobile body parts, vehicle skeletons, peripheral parts for automobile engines, automobile underhood parts, automobile gear parts, automobile interior parts, automobile exterior parts, intake/exhaust system parts, engine coolant system parts, automobile electrical equipment parts, and electric or electronic parts, which especially require excellent impregnation properties, hydrolysis resistance, and heat deterioration resistance. More specifically, fiber-reinforced resins and molded articles thereof can be preferably used for, for example, peripheral parts for aircraft engines such as fan blades; aircraft-related parts such as landing gear pods, winglets, spoilers, edges, ladders, elevators, fairings, and ribs; automobile body parts such as sheets, front bodies, underbodies, pillars, members, frames, beams, supports, rails, and hinges; peripheral parts for automobile engines such as engine covers, air intake pipes, timing belt covers, intake manifolds, filler caps, throttle bodies, and cooling fans; automobile underhood parts such as cooling fans, tops and bases of radiator tanks, cylinder head covers, oil pans, brake piping, tubes for fuel piping, and waste gas system parts; automobile gear parts such as gears, actuators, bearing retainers, bearing cages, chain guides, and chain tensioners; automobile interior parts such as shift lever brackets, steering lock brackets, key cylinders, door inner handles, door handle cowls, interior mirror brackets, air conditioner switches, instrumental panels, console boxes, glove boxes, steering wheels, and trims; automobile exterior parts such as front fenders, rear fenders, fuel lids, door panels, cylinder head covers, door mirror stays, tail gate panels, license garnishes, roof rails, engine mount brackets, rear garnishes, rear spoilers, trunk lids, rocker moldings, moldings, lamp housings, front grilles, mud guards, and side bumpers; intake/exhaust system parts such as air intake manifolds, intercooler inlets, turbo chargers, exhaust pipe covers, inner bushes, bearing retainers, engine mounts, engine head covers, resonators, and throttle bodies; engine coolant system parts such as chain covers, thermostat housings, outlet pipes, radiator tanks, oilnators, and delivery pipes; automobile electrical equipment parts such as connectors, wire harness connectors, motor parts, lamp sockets, sensor in-car switches, and combination switches; and electric or electronic parts such as electric parts including generators, electric motors, transformers, current transformers, voltage regulators, rectifiers, resistors, inverters, relays, power contacts, on/off switches, breakers, switches, knife switches, another-pole rods, motor cases, television housings, housings and internal parts for notebook computers, housings and internal parts for CRT displays, housings and internal parts for printers, housings and internal parts for mobile terminals, for example, mobile phones, mobile computers, and hand-held type mobiles, housings for ICs and LEDs, condenser base plates, fuse holders, gears, cases, and cabinets, and electronic parts including connectors, connectors for SMT, card connectors, jacks, coils, coil bobbins, sensors, LED lamps, sockets, resistors, relays, relay cases, reflectors, compact switches, power source parts, coil bobbins, condensers, variable capacitor cases, optical pickup chassis, radiators, terminal boards, transformers, plugs, printed circuit boards, tuners, speakers, microphones, headphones, compact motors, magnetic head bases, power modules, Si power modules and SiC power modules, semiconductors, liquid crystals, FDD carriages, FDD chassis, motor brush holders, transformer members, parabolic antennas, and computer-related parts.

The invention claimed is:

1. A multiaxial fabric resin base material comprising a multiaxial fabric laminate impregnated with a thermosetting resin (B),
    the multiaxial fabric base material laminate comprising fiber bundle sheets layered at different angles,
    the fiber bundle sheets comprising unidirectionally aligned fiber bundles stitched with stitching yarns composed of a thermoplastic resin (A),
    the multiaxial fabric base material laminate being penetrated in the thickness direction by other bodies of the stitching yarns, and stitched with the other bodies of the stitching yarns such that the yarns reciprocate at predetermined intervals along the longitudinal direction, and
    the thermoplastic resin (A) having a softening point, the softening point being higher than the resin impregnation temperature of the thermosetting resin (B), wherein the thermoplastic resin (A) is composed of a thermoplastic polyester resin composition (C) having a carboxyl group concentration of 0 to 20 eq/t.

2. The multiaxial fabric resin base material according to claim 1, wherein the multiaxial fabric base material is integrated with a porous thermoplastic resin layer(s) by stitching with the other bodies of the stitching yarns.

3. The multiaxial fabric resin base material according to claim 2, wherein the porous thermoplastic resin layer(s) has/have an areal weight of 5 to 50 g/m$^2$.

4. The multiaxial fabric resin base material according to claim 3, wherein the porous thermoplastic resin layer(s) is/are a non-woven fabric(s) of thermoplastic resin fibers.

5. The multiaxial fabric resin base material according to claim 2, wherein the porous thermoplastic resin layer(s) is/are a non-woven fabric(s) of thermoplastic resin fibers.

6. A multiaxial fabric resin base material comprising a multiaxial fabric impregnated with a thermosetting resin (B),
    the multiaxial fabric comprising a laminated body comprising a multiaxial fabric base material comprising fiber bundle sheets layered at different angles,
    the fiber bundle sheets comprising unidirectionally aligned fiber bundles stitched with stitching yarns composed of a thermoplastic resin (A),
    the multiaxial fabric base material being penetrated in the thickness direction by other bodies of the stitching yarns,
    the laminated body being stitched with the other bodies of the stitching yarns such that the yarns reciprocate at predetermined intervals along the surface direction between the front surface and the back surface of the laminated body, the thermoplastic resin (A) having a softening point, the softening point being higher than the resin impregnation temperature of the thermosetting resin (B), wherein the thermoplastic resin (A) is composed of a thermoplastic polyester resin composition (C) having a carboxyl group concentration of 0 to 20 eq/t.

7. The multiaxial fabric resin base material according to claim 6, wherein the thermoplastic polyester resin composition (C) is a resin composition comprising: (a) 0.05 to 5 parts by weight of a novolac epoxy resin represented by General Formula (1); and (b) 0.01 to 1 part by weight of a reducing phosphorus compound represented by General Formula (4); with respect to 100 parts by weight of thermoplastic polyester resin:

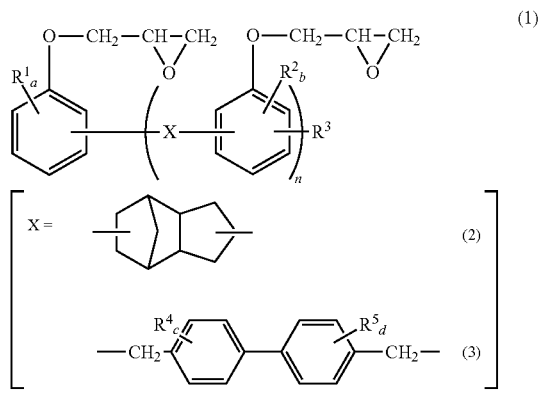

wherein
in General Formula (1), X represents a divalent group represented by General Formula (2) or (3);
in General Formulae (1) and (3), $R^1$, $R^2$, $R^4$, and $R^5$, which may be the same or different, each independently represent $C_1$-$C_8$ alkyl or $C_6$-$C_{10}$ aryl; and $R^3$ represents a hydrogen atom, $C_1$-$C_8$ alkyl, or $C_6$-$C_{10}$ aryl;
in General Formula (1), n represents a value which is higher than 0 and not higher than 10; and
in General Formulae (1) and (3), a, c, and d each independently represent an integer of 0 to 4, and b represents an integer of 0 to 3;

wherein
in General Formula (4), $R^6$ and $R^7$ are each independently selected from the group consisting of hydrogen (with the proviso that $R^6$ and $R^7$ are not simultaneously hydrogen), OM (wherein 0 is a negatively charged oxygen atom, and M is a positively charged counter ion), $C_1$-$C_{20}$ alkyl, $C_2$-$C_{20}$ alkylene, $C_6$-$C_{20}$ aryl, $C_1$-$C_{20}$ alkyloxy, polyoxyalkylene composed of $C_2$-$C_4$ alkylene, and $C_6$-$C_{20}$ aryloxy;
the alkyl, alkylene, aryl, alkyloxy, polyoxyalkylene, and/or aryloxy is/are optionally arbitrarily selectively substituted, and the substituent(s) for the arbitrary selective substitution is/are independently selected from the group consisting of an OH group, a halogen, a COOH group, a $COOR^8$ group (wherein $R^8$ is $C_1$-$C_4$ alkyl), and an $NH_2$ group;
the number of substitutions, when the alkyl, alkylene, aryl, alkyloxy, polyoxyalkylene, and/or aryloxy is/are arbitrarily selectively substituted, is 1 or 2; and
$R^6$ and $R^7$ are optionally linked together by cross-linking.

8. The multiaxial fabric resin base material according to claim 7, wherein the thermoplastic polyester resin composition (C) is a polyethylene terephthalate resin composition.

9. The multiaxial fabric resin base material according to claim 6, wherein the thermoplastic polyester resin composition (C) is a polyethylene terephthalate resin composition.

10. The multiaxial fabric resin base material according to claim 6, wherein the thermoplastic polyester resin composition (C) is a resin composition comprising: (a) 0.05 to 5 parts by weight of a novolac epoxy resin represented by General Formula (1); and (b) 0.01 to 1 part by weight of a reducing phosphorus compound represented by General Formula (4); with respect to 100 parts by weight of thermoplastic polyester resin:

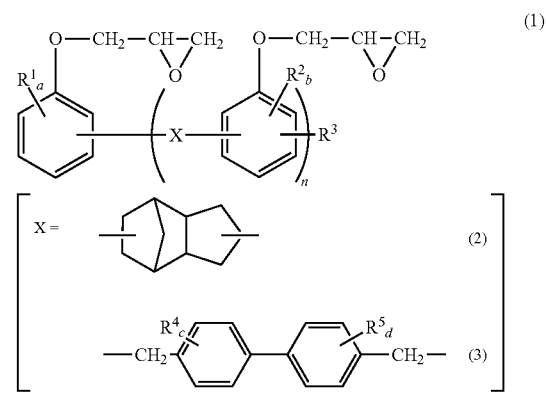

wherein
in General Formula (1), X represents a divalent group represented by General Formula (2) or (3);
in General Formulae (1) and (3), $R^1$, $R^2$, $R^4$, and $R^5$, which may be the same or different, each independently represent $C_1$-$C_8$ alkyl or $C_6$-$C_{10}$ aryl; and $R^3$ represents a hydrogen atom, $C_1$-$C_8$ alkyl, or $C_6$-$C_{10}$ aryl;
in General Formula (1), n represents a value which is higher than 0 and not higher than 10; and
in General Formulae (1) and (3), a, c, and d each independently represent an integer of 0 to 4, and b represents an integer of 0 to 3;

wherein
in General Formula (4), $R^6$ and $R^7$ are each independently selected from the group consisting of hydrogen (with the proviso that $R^6$ and $R^7$ are not simultaneously hydrogen), OM (wherein 0 is a negatively charged oxygen atom, and M is a positively charged counter ion), $C_1$-$C_{20}$ alkyl, $C_2$-$C_{20}$ alkylene, $C_6$-$C_{20}$ aryl, $C_1$-$C_{20}$ alkyloxy, polyoxyalkylene composed of $C_2$-$C_4$ alkylene, and $C_6$-$C_{20}$ aryloxy;

the alkyl, alkylene, aryl, alkyloxy, polyoxyalkylene, and/or aryloxy is/are optionally arbitrarily selectively substituted, and the substituent(s) for the arbitrary selective substitution is/are independently selected from the group consisting of an OH group, a halogen, a COOH group, a COOR$^8$ group (wherein R$^8$ is $C_1$-$C_4$ alkyl), and an NH$_2$ group;

the number of substitutions, when the alkyl, alkylene, aryl, alkyloxy, polyoxyalkylene, and/or aryloxy is/are arbitrarily selectively substituted, is 1 or 2; and R$^6$ and R$^7$ are optionally linked together by cross-linking.

* * * * *